United States Patent
Wang (10) Patent No.: US 9,372,594 B2
(45) Date of Patent: Jun. 21, 2016

(54) METHOD AND APPARATUS FOR ADDING ICON TO INTERFACE OF SYSTEM, AND MOBILE TERMINAL

(71) Applicant: HUAWEI Device Co., LTD., Shenzhen (CN)

(72) Inventor: Pei Wang, Shenzhen (CN)

(73) Assignee: HUAWEI DEVICE CO., LTD., Shenzhen (CN)

( * ) Notice: Subject to any disclaimer, the term of this patent is extended or adjusted under 35 U.S.C. 154(b) by 119 days.

(21) Appl. No.: 13/662,463

(22) Filed: Oct. 27, 2012

(65) Prior Publication Data

US 2013/0055124 A1 Feb. 28, 2013

Related U.S. Application Data (63) Continuation of application No. PCT/CN2011/073430, filed on Apr. 28, 2011.

(30) Foreign Application Priority Data

Apr. 28, 2010 (CN) .......................... 2010 1 0166490

(51) Int. Cl.
*G06F 3/0481* (2013.01)
*G06F 9/44* (2006.01)

(52) U.S. Cl.
CPC .......... *G06F 3/04817* (2013.01); *G06F 9/4443* (2013.01)

(58) Field of Classification Search
CPC ........................... G06F 3/04817; G06F 9/4443
USPC ......................................................... 715/765
See application file for complete search history.

(56) References Cited

U.S. PATENT DOCUMENTS 5,548,692 A * 8/1996 Cok .............................. 715/815
6,556,217 B1 * 4/2003 Makipaa et al. .............. 345/667

(Continued)

FOREIGN PATENT DOCUMENTS

| CN | 101833418 | 9/2010 |
| CN | 101853158 | 10/2010 |

(Continued)

OTHER PUBLICATIONS iPhone User Guide for iPhone OS 3.1 Software, Sep. 9, 2009, pp. 25-26.*

(Continued)

*Primary Examiner* — Aaron Lowenberger
(74) *Attorney, Agent, or Firm* — Staas & Halsey LLP (57) ABSTRACT

A method for adding an icon to an interface of an Android system, where the Android system has N interfaces, includes: a. obtaining add command information; b. obtaining, according to the add command information, space information of an icon to be added; c. obtaining remaining space information of an $M^{th}$ interface according to the add command information; d. judging whether the space information of the icon to be added is greater than the remaining space information of the $M^{th}$ interface; if yes, executing step e; if no, executing step f; e. judging whether the $M^{th}$ interface is a last interface to be judged; if yes, executing step g; if no, assigning M+1 to M and returning to step c; f. adding the icon to the interface; and g. establishing another interface, and adding the icon to the newly established interface; where M and N are natural numbers, and $1 \leq M \leq N$.

10 Claims, 4 Drawing Sheets

(56) References Cited

U.S. PATENT DOCUMENTS

| | | |
|---|---|---|
| 2005/0177799 A1* | 8/2005 | Knight et al. ............... 715/810 |
| 2007/0011689 A1 | 1/2007 | Hiraoka |
| 2007/0157081 A1 | 7/2007 | Hara et al. |
| 2007/0157089 A1 | 7/2007 | Van Os et al. |
| 2008/0034291 A1 | 2/2008 | Anderson et al. |
| 2009/0024944 A1 | 1/2009 | Louch et al. |
| 2009/0037605 A1 | 2/2009 | Li |
| 2009/0089668 A1 | 4/2009 | Magnani et al. |
| 2009/0313567 A1 | 12/2009 | Kwon et al. |
| 2010/0011304 A1* | 1/2010 | van Os ............... 715/762 |
| 2010/0070931 A1 | 3/2010 | Nichols |
| 2010/0223563 A1 | 9/2010 | Green |
| 2010/0295789 A1 | 11/2010 | Shin et al. |
| 2011/0022575 A1 | 1/2011 | Tomkins |
| 2011/0061010 A1* | 3/2011 | Wasko ............... 715/769 |
| 2011/0072492 A1* | 3/2011 | Mohler et al. ............... 726/3 |
| 2011/0271182 A1 | 11/2011 | Tsai et al. |
| 2012/0030628 A1 | 2/2012 | Lee et al. |
| 2012/0036459 A1 | 2/2012 | Pei et al. |
| 2012/0054663 A1 | 3/2012 | Baek et al. |
| 2012/0072871 A1* | 3/2012 | Seo et al. ............... 715/838 |
| 2012/0084692 A1 | 4/2012 | Bae |
| 2012/0304084 A1 | 11/2012 | Kim et al. |
| 2012/0311466 A1 | 12/2012 | Kluttz et al. |
| 2012/0311485 A1 | 12/2012 | Caliendo et al. |
| 2013/0050119 A1 | 2/2013 | Nemoto |
| 2013/0139109 A1 | 5/2013 | Kim et al. |
| 2013/0151983 A1 | 6/2013 | Lovitt et al. |
| 2013/0167065 A1 | 6/2013 | Chen et al. |
| 2013/0167072 A1 | 6/2013 | Ari et al. |
| 2013/0187866 A1 | 7/2013 | Kim et al. |
| 2013/0219335 A1 | 8/2013 | Zhang |
| 2013/0268895 A1 | 10/2013 | Yamaki et al. |
| 2013/0305187 A1 | 11/2013 | Phillips et al. |
| 2013/0311920 A1 | 11/2013 | Koo et al. |
| 2014/0013254 A1* | 1/2014 | Hosein ............... 715/765 |
| 2014/0068477 A1 | 3/2014 | Roh |
| 2014/0232739 A1 | 8/2014 | Kim et al. |
| 2014/0237376 A1 | 8/2014 | Cassano |
| 2015/0212691 A1* | 7/2015 | Wang et al. ............... 715/838 |

FOREIGN PATENT DOCUMENTS

| | | |
|---|---|---|
| CN | 102377876 | 3/2012 |
| CN | 102436335 | 5/2012 |
| EP | 2124142 | 11/2009 |
| EP | 2423810 | 2/2012 |

OTHER PUBLICATIONS

McKillop, How to add and remove Widgets from your Android home screen—Simple Help, Jul. 26, 2009, http://www.simplehelp.net/2009/07/26/how-to-add-and-remove-widgets-from-your-android-home-screen/.*

International Search Report, mailed Jul. 14, 2011, in corresponding International Application No. PCT/CN2011/073430 (4 pp.).

International Search Report issued Jul. 14, 2011 in corresponding International Patent Application No. PCT/CN2011/073430.

Written Opinion of the International Searching Authority issued Jul. 14, 2011 in corresponding International Patent Application No. PCT/CN2011/073430.

Extended European Search Report, dated Dec. 6, 2013, in corresponding European Application No. 11774397.1 (7 pp.).

Search Report issued on Feb. 17, 2014 is corresponding European Patent Application No. 12799505.8-1954.

Office Action issued on Sep. 30, 2014 is corresponding Japanese Patent Application No. 2014-527474.

"How to more conveniently use the Home screen of Galaxy S," Dekiru net, Impress Corporation, URL http://dekiru.neUarticle/1721/ (Jan. 14, 2011).

Office Action dated Aug. 17, 2015 issued in copending U.S. Appl. No. 13/720,039.

Office Action dated Apr. 14, 2015 issued in copending U.S. Appl. No. 13/720,039.

U.S. Appl. No. 13/720,039, Dec. 19, 2012, Kai Qian, Huawei Device Co., Ltd.

* cited by examiner

METHOD AND APPARATUS FOR ADDING ICON TO INTERFACE OF SYSTEM, AND MOBILE TERMINAL

CROSS-REFERENCE TO RELATED APPLICATIONS

This application is a continuation of International Application No. PCT/CN2011/073430, filed on Apr. 28, 2011, which claims priority to Chinese Patent Application No. 201010166490.4, filed with the Chinese Patent Office on Apr. 28, 2010 and entitled "METHOD AND APPARATUS FOR ADDING ICON TO INTERFACE of ANDROID SYSTEM, AND MOBILE TERMINAL", which is incorporated herein by reference in its entirety.

FIELD OF THE INVENTION

The present invention relates to the field of communications technologies, and in particular, to a method and an apparatus for adding an icon to an interface of an Android system, and a mobile terminal.

BACKGROUND OF THE INVENTION

At present, taking a device installed with an Android system as a representative, more and more handheld touchscreen terminal devices provide large-space Home interfaces for users, and therefore, the users are allowed to place, according to their habits and under a precondition that there is space on a current screen, icons of frequently used favorite programs, widgets, controls, folders and so on to the Home interfaces of the devices, resembling shortcuts on a computer desktop, which greatly facilitates searching for a particular application program by the users when functions of handheld devices become increasingly powerful nowadays.

During a process of implementing embodiments of the present invention, the inventor finds that the prior art has the following technical problems: If there is no space for placement on the current screen, an icon cannot be added, and a user is required to manually release space for placement, which is inconvenient for the user to operate; in addition, in the prior art, when an icon is to be added to the Home interface, it must be ensured that there are enough space on the current screen, so that the icon can be added; if there is no enough space, a series of operations of selecting an icon to be added by the user previously are invalid, and need to be performed again. As a result, a capability of intelligent interaction between a mobile phone using an Android system and a user is greatly reduced.

SUMMARY OF THE INVENTION

In view of the foregoing problems, an embodiment of the present invention provides a method for adding an icon to an interface of an Android system, where the Android system has N interfaces, and the method includes:
 a. obtaining add command information;
 b. obtaining, according to the add command information, space information of an icon to be added;
 c. obtaining remaining space information of an $M^{th}$ interface according to the add command information;
 d. judging whether the space information of the icon to be added is greater than the remaining space information of the $M^{th}$ interface; if yes, executing step e; if no, executing step f;
 e. judging whether the $M^{th}$ interface is a last interface to be judged; if yes, executing step g; if no, assigning M+1 to M and returning to step c;
 f. adding the icon to the interface, and the process ends; and
 g. establishing another interface, adding the icon to the newly established interface, and the process ends;
 where, M and N are natural numbers, and $1 \leq M \leq N$.

Meanwhile, an embodiment of the present invention further provides an apparatus for adding an icon to an interface of an Android system, where the Android system has N interfaces, and the apparatus includes:
 a first obtaining module, configured to obtain add command information;
 a second obtaining module, configured to obtain, according to the add command information, space information of an icon to be added and remaining space information of an $M^{th}$ interface;
 a first judging module, configured to judge whether the space information of the icon to be added is greater than the remaining space information of the $M^{th}$ interface;
 a second judging module, configured to judge whether the $M^{th}$ interface is a last interface to be judged; and
 an adding module, configured to add the icon to remaining space of the $M^{th}$ interface when the first judging module judges that the space information of the icon to be added is not greater than the remaining space information of the $M^{th}$ interface;
 where, M and N are natural numbers, and $1 \leq M \leq N$.

In the embodiments of the present invention, whether to add the icon to a current interface is determined by judging whether the space information of the icon to be added is smaller than or equal to remaining space information of the current interface, thereby solving a technical problem that a user is required to determine again and again whether there is enough space before adding a icon in an Android device at present, and providing a friendly and human-centered operating experience for the user, so that a capability of intelligent interaction between a mobile phone using an Android system and a user is greatly improved.

BRIEF DESCRIPTION OF THE DRAWINGS

To illustrate the technical solutions in the embodiments of the present invention more clearly, accompanying drawings required for describing the embodiments are briefly introduced in the following. Obviously, the accompanying drawings in the following description are merely some embodiments of the present invention, and persons of ordinary skills in the art may further obtain other drawings according to the accompanying drawings without creative efforts.

DETAILED DESCRIPTION OF THE EMBODIMENTS

The technical solutions in the embodiments of the present invention are clearly and completely described in the following with reference to the accompanying drawings.

Evidently, the embodiments to be described are merely part of rather than all of the embodiments of the present invention. All other embodiments obtained by persons of ordinary skill in the art based on the embodiments of the present invention without creative efforts shall fall within the protection scope of the present invention.

Embodiment 1

Figure 1:
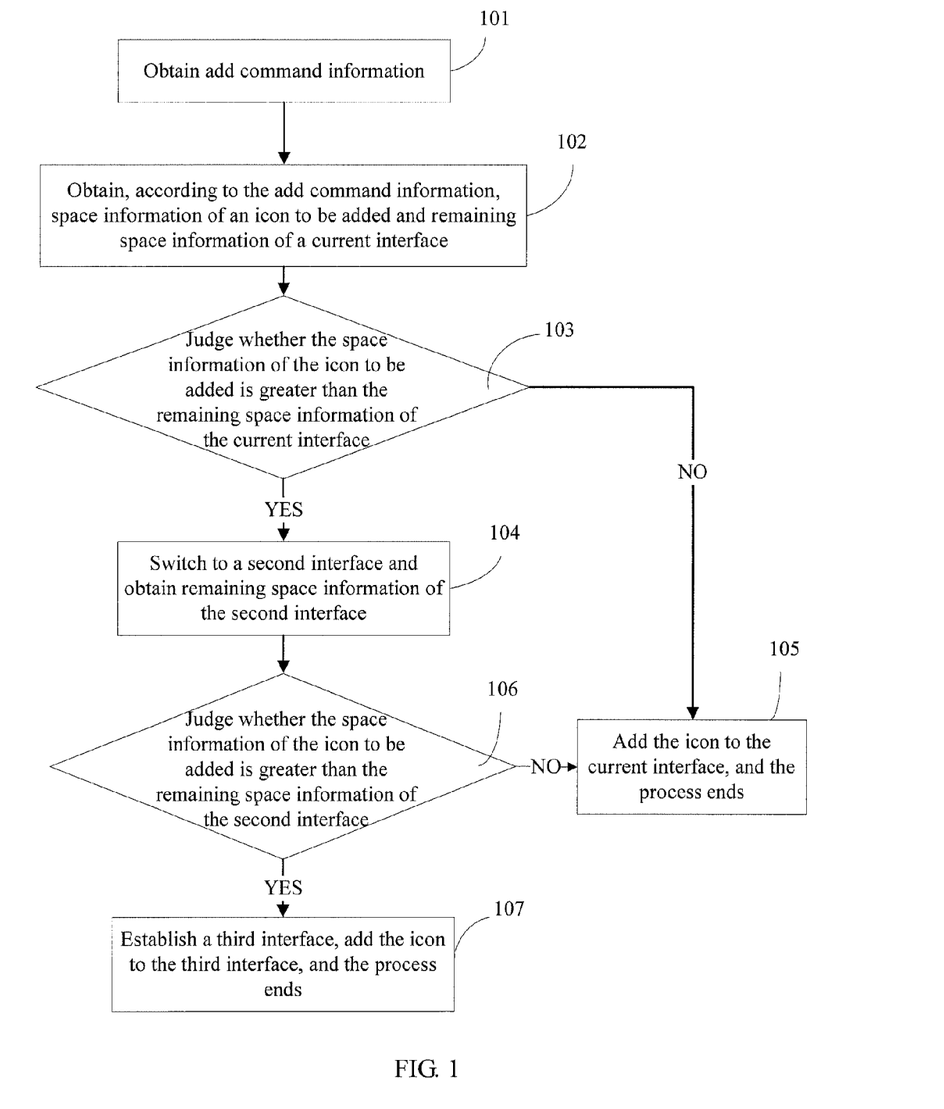
FIG. 1 is a flowchart of a method according to Embodiment 1 of the present invention.

Taking a mobile phone using an Android system with 2 interfaces as an example, Embodiment 1 of the present invention provides a method for adding an icon to an interface of an Android system. Referring to FIG. 1, the method specifically includes:

Step 101: Obtain add command information, where the add command information is command information generated by a mobile terminal system due to a relevant operation of a user when the user needs to move an icon of a certain application program. For example, in a mobile terminal (such as a PC, PDA, and mobile phone) installed with an Android system, when the user presses an icon of a photographing application program, the mobile terminal can obtain the add command information, and determine that the user needs to perform a corresponding add operation on the icon.

Step 102: Obtain, according to the add command information, space information of an icon to be added and remaining space information of a current interface.

The icon mentioned in the embodiment of the present invention specifically refers to icons that are capable of representing visibility or touchability of various application programs, such as a shortcut (shortcut), widget (Widget), folder, sticker, and bookmark. After obtaining the add command information, the mobile terminal obtains, according to the add command information, the space information of the icon to be added. The space information may be two-dimensional plane information, and may also be three-dimensional information. For example, the mobile terminal may obtain an icon with space information being 2×2 square units (such as centimeters). Meanwhile, the mobile terminal may obtain the remaining space information of the current interface. Because the icon to be added needs to be added to the current interface, the mobile terminal needs to determine how much space is left on the current interface. For example, the mobile terminal determines the remaining space information through a grid parameter established by the system itself and information of space that has been occupied by application program icons.

Step 103: Judge whether the space information of the icon to be added is greater than the remaining space information of the current interface; if yes, execute step 104; if no, execute step 105.

For example, the space information of the icon to be added is 2×2 square units, and the remaining space information is 3×2 square units; this square unit takes a horizontal axis—X axis and a longitudinal axis—Y axis of a Cartesian coordinate system as a reference system. The mobile terminal judges that 2<3 and 2≤2, which indicates that the space information of the icon to be added is smaller than or equal to the remaining space information of the current interface. Therefore, the mobile terminal adds the icon to the current interface. Certainly, the space information mentioned in the example is plane information; in the embodiment of the present invention, the space information of the icon and the remaining space information may also be three-dimensional space information. For example, the space information of the icon to be added is 2×2×2 cubic units, and the remaining space information is 3×2×4 cubic units; the mobile terminal judges that 2<3, 2≤2, and 2<4, which indicates that the space information of the icon to be added is smaller than or equal to the remaining space information of the current interface. Therefore, the mobile terminal adds the icon to the current interface; otherwise, the mobile terminal searches for a next interface, and judges whether the next interface has enough remaining space information for adding the icon.

Step 104: Switch to a second interface, obtain remaining space information of the second interface, and execute step 106.

Step 105: Add the icon to the current interface, and the process ends.

Step 106: Judge whether the space information of the icon to be added is greater than the remaining space information of the second interface; if yes, execute step 107; if no, execute step 105.

Step 107: Establish a third interface, add the icon to the third interface, and the process ends.

In Embodiment 1 of the present invention, whether to add the icon to the current interface is determined by judging whether the space information of the icon to be added is smaller than or equal to remaining space information of the current interface, thereby solving a technical problem that a user is required to determine again and again whether there is enough space before adding a icon in an Android device at present, greatly improving a capability of intelligent interaction between the mobile phone using the Android system and the user, and providing a friendly and human-centered operating experience for the user, so that the user has a good experience from visual and ease of use perspectives during an operation.

Embodiment 2

Figure 2:
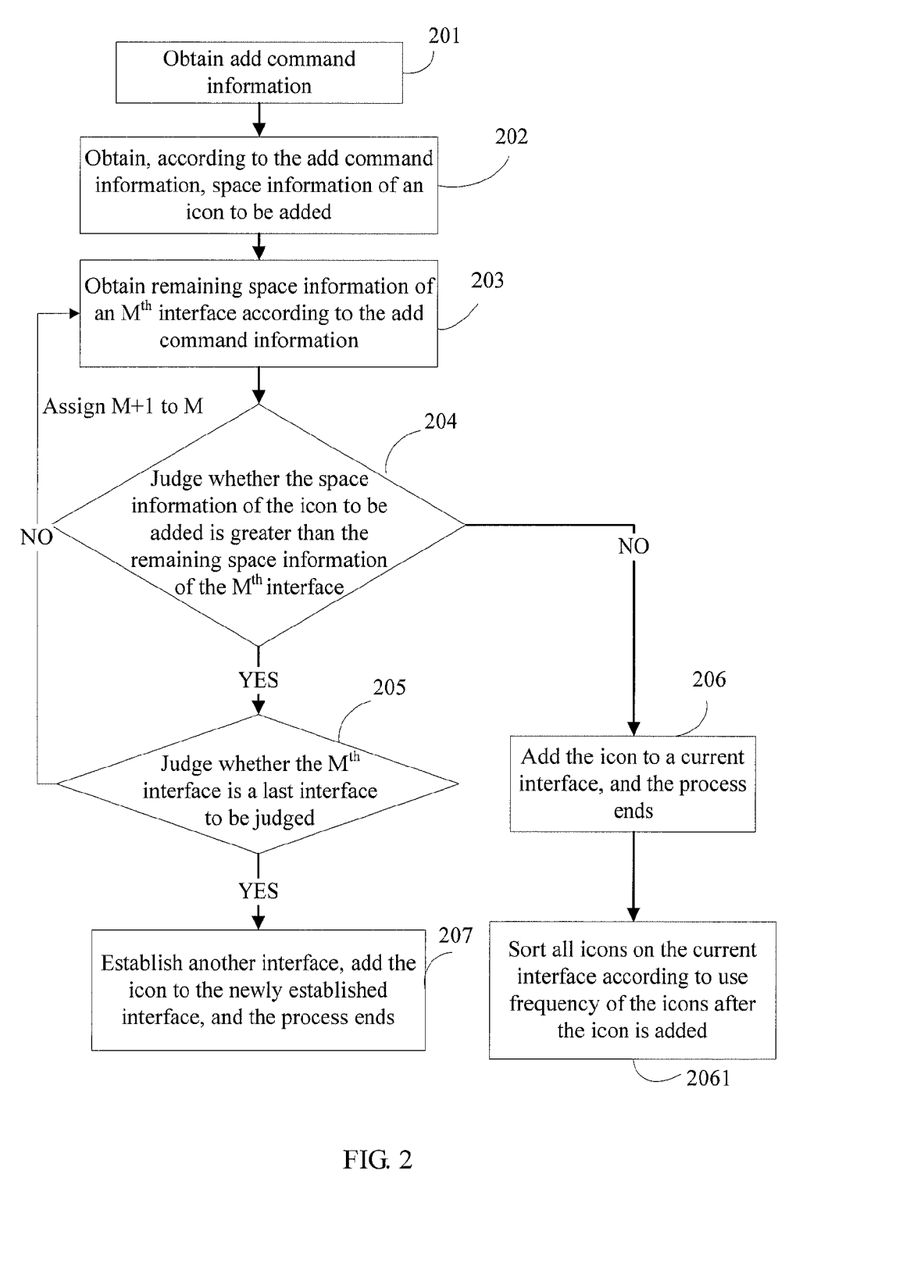
FIG. 2 is a flowchart of a method according to Embodiment 2 of the present invention.

In Embodiment 1, the mobile terminal using the Android system with 2 interfaces is taken as an example for illustration; Embodiment 2 of the present invention is described specifically below by using an Android system with N interfaces. Referring to FIG. 2, Embodiment 2 of the present invention provides a method for adding an icon to an interface of an Android system, and the method specifically includes:

Step 201: Obtain add command information, where the add command information is command information generated by a mobile terminal system due to a relevant operation of a user when the user needs to move an icon of a certain application program. For example, in a mobile terminal (such as a PC, PDA, and mobile phone) installed with an Android system, when the user presses an icon of a photographing application program, the mobile terminal can obtain the add command information, and determine that the user needs to perform a corresponding add operation on the icon.

Step 202: Obtain, according to the add command information, space information of an icon to be added.

Step 203: Obtain remaining space information of an $M^{th}$ interface according to the add command information.

The icon mentioned in the embodiment of the present invention specifically refers to icons that are capable of representing visibility or touchability of various application programs, such as a shortcut (shortcut), widget (Widget), folder, sticker, and bookmark. After obtaining the add command information, the mobile terminal obtains, according to the add command information, the space information of the icon to be added. The space information may be two-dimensional plane information, and may also be three-dimensional information. For example, the mobile terminal may obtain an icon with space information being 2×2 square units (such as centimeters). Meanwhile, the mobile terminal may obtain remaining space information of a current interface. Because the icon to be added needs to be added to the current interface, the mobile terminal needs to determine how much space is left on the current interface. For example, the mobile terminal determines the remaining space information through a grid parameter established by the system itself and information of space that has been occupied by application program icons.

Step 204: Judge whether the space information of the icon to be added is greater than the remaining space information of the $M^{th}$ interface; if yes, execute step 205; if no, execute step 206.

Step 205: Judge whether the $M^{th}$ interface is a last interface to be judged; if yes, execute step 207; if no, assign M+1 to M, and return to step 203.

Step 206: Add the icon to the interface, and the process ends.

Step 207: Establish another interface, add the icon to the newly established interface, and the process ends.

M and N are natural numbers, and 1≤M≤N.

The following takes a mobile terminal using an Android system with 3 interfaces as an example to describe the foregoing process in detail. A terminal user performs an operation on a corresponding icon; the mobile terminal obtains add command information, and obtains, according to the command information, space information of the icon and remaining space information of a current interface (which may be called a first interface). Then, judge whether the space information of the icon is greater than the remaining space information of the current first interface; if no, add the icon to the current first interface directly; if yes, judge whether the current first interface is a last interface to be judged. An interface to be judged is obtained through a calculation according to interfaces of the system and an interface that has been judged; in the embodiment, because in the judging step, only the first interface is judged, and there are 2 interfaces which are not judged yet, the current first interface is not the last interface to be judged. Therefore, judge a second interface, which is judging whether the space information of the icon is greater than remaining space information of the second interface; if no, add the icon to the second interface directly; if yes, judge whether the second interface is the last interface to be judged. In the embodiment, because in the judging step, only the first interface and the second interface are judged, and there is a third interface which is not judged yet, the second interface is not the last interface to be judged. Therefore, judge the third interface, which is judging whether the space information of the icon is greater than remaining space information of the third interface; if no, add the icon to the third interface directly; if yes, judge whether the third interface is the last interface to be judged. In the embodiment of the present invention, the third interface is the last interface to be judged, which indicates that none of the three interfaces of the system has enough remaining space information for adding and placing the icon. In this case, the system establishes a new interface—which is called a fourth interface. The fourth interface is newly established, and no application program icon is placed on the interface. Therefore, remaining space information of the interface is whole space of the interface, and the icon may be added to the fourth interface. It may be understandable that, in the embodiment of the present invention, the number of interfaces possessed by the mobile terminal using the Android system is not limited to 3, and may also be multiple, and an operation of adding an application program icon to an interface may also be performed according to the foregoing method process.

Optionally, after step 206, the method further includes:

Step 2061: After the icon is added, sort all icons on the current interface according to use frequency of the icons. There may be icons of multiple application programs placed on an interface to which the icon is added. The user sorts and then places these icons and the newly added icon, so that an icon of a most frequently used application program may be placed at a most eye-catching or top position, which facilitates an operation of the user.

In the embodiment of the present invention, whether to add the icon to the current interface is determined by judging whether the space information of the icon to be added is smaller than or equal to remaining space information of the current interface, thereby solving a technical problem that a user is required to determine again and again whether there is enough space before adding a icon in an Android device at present, greatly improving a capability of intelligent interaction between a mobile phone using an Android system and the user, and providing a friendly and human-centered operating experience for the user, so that the user has a good experience from visual and ease of use perspectives during an operation.

Embodiment 3

Figure 3:
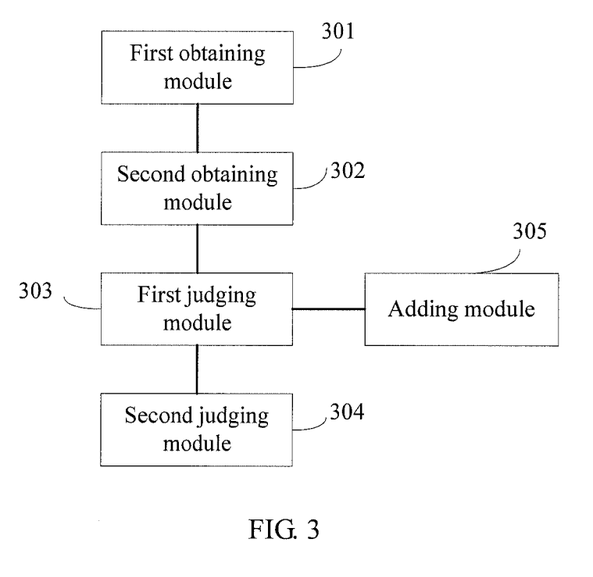
FIG. 3 is a schematic diagram of an apparatus according to Embodiment 3 of the present invention.

Embodiment 3 of the present invention provides an apparatus for adding an icon to an interface of an Android system, where the Android system has N interfaces; referring to FIG. 3, the apparatus includes:

a first obtaining module 301, configured to obtain add command information;

a second obtaining module 302, configured to obtain, according to the add command information, space information of an icon to be added and remaining space information of an $M^{th}$ interface;

a first judging module 303, configured to judge whether the space information of the icon to be added is greater than the remaining space information of the $M^{th}$ interface;

a second judging module 304, configured to judge whether the $M^{th}$ interface is a last interface to be judged; and an adding module 305, configured to add the icon to remaining space of the $M^{th}$ interface when the first judging module judges that the space information of the icon to be added is not greater than the remaining space information of the $M^{th}$ interface;

where, M and N are natural numbers, and 1≤M≤N.

Figure 4:
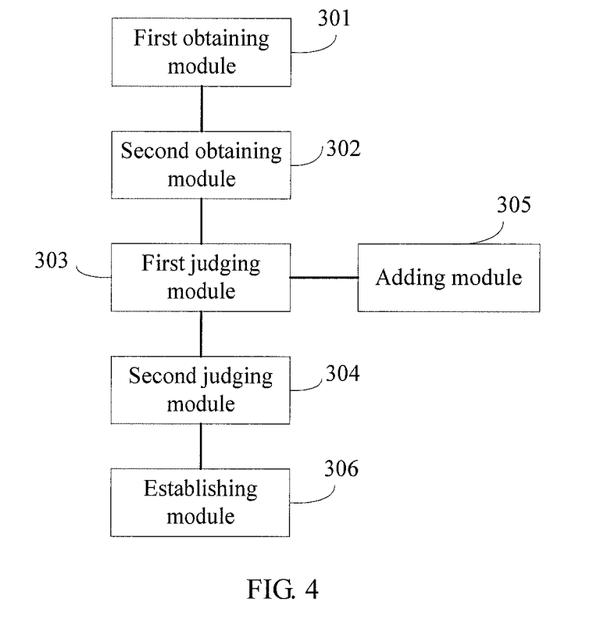
FIG. 4 is another schematic diagram of the apparatus according to Embodiment 3 of the present invention.

Further, referring to FIG. 4, the apparatus may further include:

an establishing module 306, configured to establish another interface when the second judging module judges that the $M^{th}$ interface is the last interface to be judged;

where, the adding module 305 is further configured to add the icon to the newly established interface.

Figure 5:
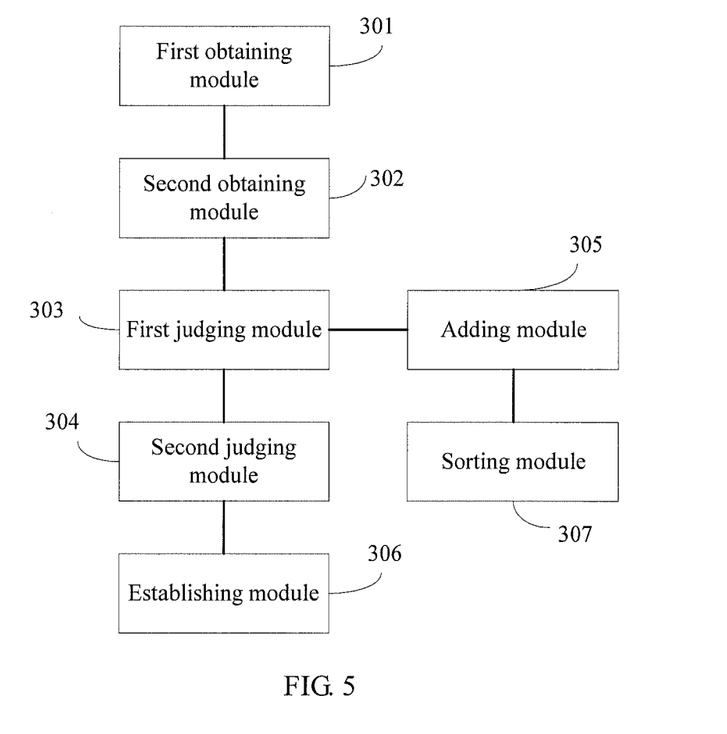
FIG. 5 is another schematic diagram of the apparatus according to Embodiment 3 of the present invention.

Further, referring to FIG. 5, the apparatus may further include:

a sorting module 307, configured to sort all icons on a current interface according to use frequency of the icons and an interface to which the adding module 305 adds the icon. There may be icons of multiple application programs placed on the interface to which the icon is added. A user sorts and then places these icons and the newly added icon, so that an icon of a most frequently used application program may be placed at a most eye-catching or top position, which facilitates an operation of the user.

In the embodiment of the present invention, whether to add the icon to the current interface is determined by judging whether the space information of the icon to be added is smaller than or equal to remaining space information of the current interface, thereby solving a technical problem that a user is required to determine again and again whether there is enough space before adding a icon in an Android device at present, greatly improving a capability of intelligent interaction between a mobile phone using an Android system and the user, and providing a friendly and human-centered operating experience for the user, so that the user has a good experience from visual and ease of use perspectives during an operation.

Embodiment 4

Embodiment 4 of the present invention discloses a mobile terminal using an Android system, where the mobile terminal includes a baseband chip, a touch screen, an antenna, and so on, and the mobile terminal may further include the apparatus for adding the icon to the interface in Embodiment 3. Specifically, the mobile terminal may be a terminal device such as a mobile phone using an Android system, a PDA (personal digital assistant), a home information display (Home Information Display, HID), a tablet, or a mobile Internet device (Mobile Internet Device, MID).

Persons of ordinary skill in the art should understand that all or part of the processes of the method according to the foregoing embodiments may be implemented by a computer program instructing relevant hardware. The program may be stored in a computer readable storage medium. When the program is run, the processes of the method according to the foregoing embodiments may be performed. The storage medium may be a magnetic disk, an optical disk, a read-only memory (Read-Only Memory, ROM), a random access memory (Read-Only Memory, RAM), and so on.

The foregoing is merely exemplary embodiments of the present invention, but is not intended to limit the present invention. Any modification, equivalent replacement, or improvement made without departing from the spirit and principle of the present invention shall fall within the protection scope of the present invention.

What is claimed is:

1. A method of adding an icon to an interface of a system that has N interfaces, and the method comprises:
    obtaining add command information related with an $M^{th}$ interface;
    obtaining, according to the add command information, space information of an icon to be added, the icon representing accessibility of a function triggered by the icon and the obtaining of the space information includes three-dimensional space information;
    obtaining remaining space information of the $M^{th}$ interface according to the add command information;
    executing a first judging of whether the space information of the icon to be added is greater than the remaining space information of the $M^{th}$ interface, and adding the icon to the $M^{th}$ interface while the first judging indicates the space information of the icon is less than the remaining space information of the $M^{th}$ interface;
    executing a second judging of whether the $M^{th}$ interface is a last interface to be judged responsive to the first judging indicating that the space information of the icon is greater than the remaining space information of $M^{th}$ interface, assigning M+1 to M while the $M^{th}$ interface is other than the last interface and determining remaining space information of M+1 interface relative to the space information of the icon, the icon being added to the M+1 interface while the determining indicates the space information of the icon is less than the remaining space information of M+1 interface;
    establishing a new interface responsive to the first judging that the space information of the icon is greater than the remaining space information of the $M^{th}$ interface, while the second judging indicates the $M^{th}$ interface as the last interface; and
    adding the icon to the established interface; and
    wherein M and N are natural numbers, and $1 \leq M \leq N$.

2. The method according to claim 1, comprising: after adding the icon, sorting all icons on a current interface according to use frequency of the icons.

3. The method according to claim 1, comprising:
    determining the remaining space information of at least the $M^{th}$ interface through a grid parameter established by the system and information of space that has been occupied by application program icons.

4. The method according to claim 1, wherein the icon is a shortcut icon, a widget, a folder, or a bookmark.

5. An apparatus for adding an icon to an interface of a system that has N interfaces, and the apparatus comprises:
    computer hardware configured by at least one program to implement:
    a first obtaining module, configured to obtain add command information related with an $M^{th}$ interface;
    a second obtaining module, configured to obtain, according to the add command information, space information of an icon to be added and remaining space information of the $M^{th}$ interface, the icon representing accessibility of a function triggered by the icon and the space information obtained including three-dimensional space information;
    a first judging module, configured to judge whether the space information of the icon to be added is greater than the remaining space information of the $M^{th}$ interface;
    a second judging module, configured to judge whether the $M^{th}$ interface is a last interface to be judged in accordance with a result of the judging by the first judging module that indicates the space information of the icon is greater than the remaining space information of the $M^{th}$ interface, assigning M+1 to M while the $M^{th}$ interface is judged to be other than the last interface and determining remaining space information of M+1 interface relative to the space information of the icon; and
    an adding module, configured to add the icon to the remaining space of the $M^{th}$ interface while the first judging module judges that the space information of the icon to be added is less than the remaining space information of the $M^{th}$ interface and configured to add the icon to the M+1 interface while the determining indicates the space information of the icon is less than the remaining space information of M+1 interface; and
    wherein a new interface is established responsive to the space information of the icon being judged as being greater than the remaining space information of the $M^{th}$ interface while the $M^{th}$ interface is judged as the last interface, the icon being added to the established interface, and
    wherein M and N are natural numbers, and $1 \leq M \leq N$.

6. The apparatus according to claim 5, wherein the apparatus further comprises:
    a sorting module, configured to sort all icons on a current interface according to use frequency of the icons and an interface to which the adding module adds the icon.

7. A mobile terminal using a system that has N interfaces, wherein the mobile terminal comprises: a baseband chip, a touch screen, and an antenna, and comprises an apparatus for adding an icon to an interface of the system, and the apparatus comprises:
> computer hardware configured to implement:
> > a first obtaining module, configured to obtain add command information related with an $M^{th}$ interface;
> > a second obtaining module, configured to obtain, according to the add command information, space information of an icon to be added and remaining space information of the $M^{th}$ interface, the icon representing accessibility of a function triggered by the icon and the space information obtained including three-dimensional space information;
> > a first judging module, configured to judge whether the space information of the icon to be added is greater than the remaining space information of the $M^{th}$ interface;
> > a second judging module, configured to judge whether the $M^{th}$ interface is a last interface to be judged in accordance with a result of the judging by the first judging module that indicates the space information of the icon is greater than the remaining space information of the $M^{th}$ interface, and M+1 is assigned to M while the $M^{th}$ interface is other than the last interface and determining remaining space information of M+1 interface relative to the space information of the icon; and
> > an adding module, configured to add the icon to remaining space of the $M^{th}$ interface while the first judging module judges that the space information of the icon to be added is less than the remaining space information of the $M^{th}$ interface and configured to add the icon to the M+1 interface while the determining indicates the space information of the icon is less than the remaining space information of the M+1 interface;
> > wherein a new interface is established responsive to the space information of the icon being judged as greater than the remaining space information of the $M^{th}$ interface while the $M^{th}$ interface is judged as the last interface, the icon being added to the established interface, and
> > wherein M and N are natural numbers, and 1≤M≤N.

8. A non-transitory computer-readable storage medium having a program recorded thereon causing a computer execute a method for adding an icon to an interface of a system that has N interfaces, and the method comprises:
> obtaining add command information related with an $M^{th}$ interface;
> obtaining, according to the add command information, space information of an icon to be added, the icon representing accessibility of a function triggered by the icon and the obtaining of the space information includes three-dimensional space information;
> obtaining remaining space information of the $M^{th}$ interface according to the add command information;
> executing a first judging of whether the space information of the icon to be added is greater than the remaining space information of the $M^{th}$ interface, and adding the icon to the $M^{th}$ interface while the first judging indicates the space information of the icon is less than the remaining space information of the $M^{th}$ interface;
> executing a second judging of whether the $M^{th}$ interface is a last interface to be judged responsive to the judging indicating that the space information of the icon is greater than the remaining space information of the $M^{th}$ interface, assigning M+1 to M while the $M^{th}$ interface is other than the last interface and determining remaining space information of M+1 interface relative to the space information of the icon, and adding the icon to the M+1 interface while the determining indicates the space information of the icon is less than the remaining space information of the M+1 interface;
> establishing a new interface responsive to the first judging that the space information of the icon is greater than the remaining space information of the $M^{th}$ interface, while the second judging indicates the $M^{th}$ interface as the last interface; and
> adding the icon to the new established interface; and
> wherein M and N are natural numbers, and 1≤M≤N.

9. The non-transitory computer-readable storage medium having apparatus according to claim 8, wherein the add command information is generated prior to the adding of the icon.

10. A mobile terminal using a system that has N interfaces, wherein the mobile terminal comprises: a baseband chip, a touch screen, and an antenna, and comprises an apparatus for adding an icon to an interface of the system, and the apparatus configured to implement:
> obtaining add command information related with an $M^{th}$ interface;
> obtaining, according to the add command information, space information of an icon to be added, the icon representing accessibility of a function triggered by the icon and the obtaining of the space information includes three-dimensional space information;
> obtaining remaining space information of the $M^{th}$ interface according to the add command information;
> executing a first judging of whether the space information of the icon to be added is greater than the remaining space information of the $M^{th}$ interface, and adding the icon to the $M^{th}$ interface while the first judging indicates the space information of the icon is less than the remaining space information of the $M^{th}$ interface;
> executing a second judging of whether the $M^{th}$ interface is a last interface to be judged responsive to the judging indicating the space information of the icon is greater than the remaining space information of the $M^{th}$ interface, assigning M+1 to M while the $M^{th}$ interface is other than the last interface and determining remaining space information of M+1 interface relative to the space information of the icon, and adding the icon to the M+1 interface while the determining indicates the space information of the icon is less than the remaining space information of the M+1 interface;
> establishing a new interface responsive to the judging that the space information of the icon is greater than the remaining space information of the $M^{th}$ interface, while the second judging indicates the $M^{th}$ interface as the last interface; and
> adding the icon to the new established interface; and
> wherein M and N are natural numbers, and 1≤M≤N.

* * * * *